(12) United States Patent
Simons et al.

(10) Patent No.: US 10,640,936 B2
(45) Date of Patent: May 5, 2020

(54) METHOD OF MOUNTING A WEIGH-IN-MOTION SENSOR IN A ROADWAY

(71) Applicant: Kistler Holding AG, Winterthur (CH)

(72) Inventors: Gerd Simons, Zürich (CH); Kim Pfluger, Winterthur (CH)

(73) Assignee: KISTLER HOLDING AG, Winterthur (CH)

(*) Notice: Subject to any disclaimer, the term of this patent is extended or adjusted under 35 U.S.C. 154(b) by 0 days.

(21) Appl. No.: 16/290,005

(22) Filed: Mar. 1, 2019

(65) Prior Publication Data

US 2019/0271124 A1 Sep. 5, 2019

(30) Foreign Application Priority Data

Mar. 5, 2018 (EP) .................................... 18159879

(51) Int. Cl.
*E01F 11/00* (2006.01)
*E01C 11/00* (2006.01)
(Continued)

(52) U.S. Cl.
CPC ............ *E01F 11/00* (2013.01); *E01C 11/005* (2013.01); *E01C 23/0993* (2013.01);
(Continued)

(58) Field of Classification Search
CPC .... E01F 11/00; E01C 11/005; E01C 23/0993; G01G 19/02; G01G 19/024; G01G 19/03
(Continued)

(56) References Cited

U.S. PATENT DOCUMENTS 5,069,577 A * 12/1991 Murphy ................. E01F 9/571
404/11
5,265,481 A 11/1993 Sonderegger et al.
(Continued)

FOREIGN PATENT DOCUMENTS

CN 104374459 2/2015
EP 0491655 6/1992
(Continued)

OTHER PUBLICATIONS

European Search Report and Written Opinion of the International Searching Authority, Application No. 18159879.8-1001, dated Aug. 6, 2018, 11 pages.
(Continued)

*Primary Examiner* — Raymond W Addie
(74) *Attorney, Agent, or Firm* — Dority & Manning

(57) ABSTRACT

A method for mounting a Weigh-In-Motion (WIM) sensor in a roadway that includes a surface layer and a base layer directly adjacent to the surface layer includes making a groove that extends down to the base layer of the roadway. The WIM sensor is inserted into the groove, and then grout is poured into the groove onto the WIM sensor. A WIM sensor for being embedded in a groove beneath the exposed upper surface of a roadway includes a force introduction flange with an upper surface and having a lateral surface connected by an edge to the upper surface so that the lateral surface is disposed at an angle with respect to the upper surface.

14 Claims, 8 Drawing Sheets

(51) Int. Cl.
*E01C 23/09* (2006.01)
*G01G 19/03* (2006.01)
*G01G 19/02* (2006.01)

(52) U.S. Cl.
CPC ........... *G01G 19/024* (2013.01); *G01G 19/03* (2013.01); *G01G 19/02* (2013.01)

(58) Field of Classification Search
USPC ..................................... 404/6, 12–32, 72, 75
See application file for complete search history.

(56) References Cited

U.S. PATENT DOCUMENTS

| | | | |
|---|---|---|---|
| 5,461,924 A | 10/1995 | Calderara et al. | |
| 5,520,056 A | 5/1996 | Buisson | |
| 6,301,511 B1* | 10/2001 | Fujita | G05B 19/19 700/71 |
| 2007/0020046 A1* | 1/2007 | Rastegar | E01F 13/123 404/15 |
| 2007/0062289 A1* | 3/2007 | Heyman | G01G 9/00 73/597 |
| 2008/0179791 A1* | 7/2008 | Bown | E01F 9/571 264/328.1 |
| 2009/0041541 A1* | 2/2009 | Lowe | E01F 9/553 404/14 |
| 2011/0127090 A1* | 6/2011 | Vijayaraghavan | G01G 19/03 177/133 |
| 2011/0232973 A1* | 9/2011 | Abercrombie | G01G 19/024 177/132 |
| 2013/0024152 A1* | 1/2013 | Hofmann | G01G 23/01 702/101 |
| 2014/0345955 A1* | 11/2014 | Cornu | G01G 3/13 177/180 |
| 2016/0187183 A1* | 6/2016 | Cornu | G01G 19/024 177/132 |
| 2019/0194886 A1* | 6/2019 | Yamamoto | E01F 11/00 |
| 2019/0346303 A1* | 11/2019 | Kroll | G01G 21/23 |

FOREIGN PATENT DOCUMENTS

| | | |
|---|---|---|
| EP | 0654654 | 5/1995 |
| EP | 1070942 | 1/2001 |
| JP | H07198462 | 8/1995 |
| JP | 2000215391 | 8/2000 |
| JP | 2013124895 | 6/2013 |

OTHER PUBLICATIONS

Japanese Office Action and Translation, dated Jan. 28, 2020, 7 pages.

* cited by examiner

METHOD OF MOUNTING A WEIGH-IN-MOTION SENSOR IN A ROADWAY

FIELD OF THE INVENTION

The invention relates to a method of mounting a Weigh-In-Motion sensor in a roadway.

BACKGROUND OF THE INVENTION

A WIM sensor is a force transducer to be mounted in a roadway. By means of the WIM sensor inserted in the roadway, it is possible to determine a weight force of a vehicle traveling on the roadway. In the embodiment of a piezoelectric force transducer, a WIM sensor thus detects the weight force of a vehicle crossing the WIM sensor at a speed of up to 250 km/h with a sensitivity of several pC/N and with an accuracy of several percent. The weight force detected may be used to derive a broad range of traffic information such as wheel load, axle load, total weight, wheel pressure of the traveling vehicle.

A WIM sensor of the aforementioned type is disclosed in U.S. Pat. No. 5,265,481, which is hereby incorporated herein by this reference for all purposes. The WIM sensor comprises a cylindrical hollow profile made of metal having a diameter of 20 mm to 30 mm and a length of up to several meters. In the hollow profile are arranged a plurality of disc-shaped piezoelectric transducer elements. The WIM sensor is introduced in a groove of a depth of 30 mm to 50 mm in a surface layer of the roadway and cast with grout. The hollow profile has two functions, it protects the piezoelectric transducer elements from harmful environmental conditions and it directs a weight force to the piezoelectric transducer elements. Upon detecting a weight force, a piezoelectric transducer element emits an electrical signal that is proportional to the magnitude of the weight force detected and the emitted electrical signal is forwarded to an evaluation unit arranged outside of the hollow profile where the signal is evaluated. WIM sensor and evaluation unit constitute a system for automatic determination of traffic information.

However, the service life of a WIM sensor is longer than the service life of the surface layer of the roadway, especially on a roadway with intense traffic. Thus, if the surface layer of the roadway must be restored due to wear, then the WIM sensor inserted therein will be damaged and must be replaced.

Furthermore, also the WIM sensor itself placed in the surface layer of the roadway may be subject to wear, for example when the grout enclosing the WIM sensor is damaged and worn off locally as a result of adverse environmental conditions so that the WIM sensor is exposed to direct mechanical contact with traveling vehicles which adversely affects the service life of the WIM sensor.

Finally, the groove cast with grout differs in color from the surface layer of the road. This visually recognizable groove may distract and/or disconcert the drivers of the vehicles and cause dangerous evasive maneuvers which may be detrimental for traffic safety. In addition, the drivers of the vehicles may associate the telltale color difference in the surface of the roadway with the underlying presence of a WIM sensor that is mounted in a particular position and accordingly may perform dangerous evasive maneuvers that may be detrimental for traffic safety just to avoid detection of the weight force of their vehicle, for example in cases where a toll is charged depending on the vehicle weight force detected.

BRIEF OBJECTS AND SUMMARY OF THE INVENTION

It is a first object of the present invention to provide a method of mounting a WIM sensor in a roadway, which WIM sensor mounted in the roadway is not damaged when the surface layer of the road is restored. It is another object of the invention to provide a method of mounting such a WIM sensor in a roadway wherein said mounted WIM sensor is subject to significantly less wear and wherein the mounting location thereof is not visually recognizable for drivers of vehicles on the roadway.

At least one of these objects is achieved by the features described below.

The invention relates to a method of mounting a Weigh-In-Motion (WIM) sensor in a roadway; which mounted WIM sensor detects a weight force of a vehicle traveling on the roadway; said roadway comprising a surface layer and a base layer directly adjacent to the surface layer; wherein a groove is made in said roadway, said groove extending down to the base layer; wherein said WIM sensor is inserted in the groove; and said groove is cast with grout.

The invention abandons installing the WIM sensor in the surface layer of the roadway. According to the invention, the WIM sensor is inserted in a groove that extends down to a base layer directly underneath the surface layer.

Preferably, the groove is prepared in the base layer to such a depth that the WIM sensor inserted in the groove does not protrude beyond a base layer surface of the base layer.

This has the first advantage that if the surface layer of the roadway is replaced, then it will be impossible to damage the WIM sensor mounted in the roadway since the WIM sensor is inserted completely underneath the surface layer, namely in the base layer.

This has the further advantage that the installed WIM sensor is protected by the intact surface layer from direct mechanical contact with traveling vehicles so that the mounted WIM sensor thus is exposed to significantly less wear.

Preferably, the groove is prepared in a roadway without surface layer; the groove is cast with as much grout as necessary for the grout to be flush with a base layer surface of the base layer; and after the groove is cast with grout, then a surface layer is applied on the base layer.

This has the additional advantage that a mounting location will not be visually recognizable for drivers of vehicles on the roadway.

BRIEF DESCRIPTION OF THE DRAWINGS

Aspects and advantages of the invention are set forth below in the following description, or may be obvious from the description, or may be learned through practice of embodiments of the invention. Those of ordinary skill in the art will better appreciate the features and aspects of such embodiments, and others, upon review of the specification. A full and enabling disclosure of the present invention, including the best mode thereof to one skilled in the art, is set forth more particularly in this specification, including reference to the accompanying figures, in which.

DETAILED DESCRIPTION OF THE DRAWINGS

Figure 1:
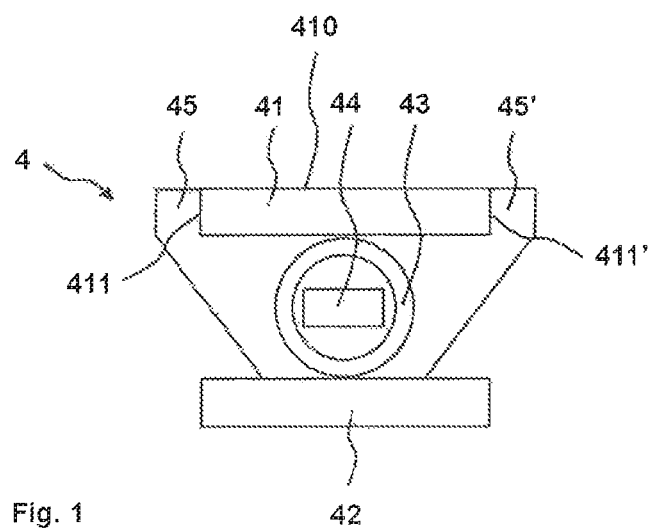
FIG. 1 shows a schematic cross section through a portion of an embodiment of a WIM sensor.

The accompanying drawings, which are incorporated in and constitute a part of this specification, illustrate at least one presently preferred embodiment of the invention as well as some alternative embodiments. These drawings, together with the written description, serve to explain the principles of the invention but by no means are intended to be exhaustive of all of the possible manifestations of the invention.

Reference will now be made in detail to present exemplary embodiments of the invention, wherein one or more examples of which are illustrated in the accompanying drawings. The detailed description uses numerical and letter designations to refer to features in the drawings. Like or similar designations in the drawings and description have been used to refer to like or similar parts of the embodiments of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all sub-ranges located within the prescribed limits, inclusive of the limits themselves unless otherwise stated. For instance, a range from 100 to 200 also includes all possible sub-ranges, examples of which are from 100 to 150, 170 to 190, 153 to 162, 145.3 to 149.6, and 187 to 200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

FIG. 1 shows an embodiment of a WIM sensor 4. FIGS. 2 to 7 show a first embodiment of the method according to the invention of mounting the WIM sensor 4 in a roadway 12, and FIGS. 8 to 14 show a second embodiment of the method according to the invention of mounting the WIM Sensors 4 in a roadway 12.

Roadway 12 comprises a surface layer 1, 1' and a base layer 2 directly underneath the surface layer 1, 1'. Vehicles traveling on the roadway 12 are in direct mechanical contact with a road surface 10 of the surface layer 1, 1'. As used herein, the road surface 10 of the surface layer 1, 1' is the uppermost surface of the roadway and is in direct mechanical contact with the tires of the vehicles traveling on the roadway 12. The vehicles are not represented figuratively here. The surface layer 1, 1' lies above the base layer 2. For the purposes of the present invention, terms describing properties of the surface layer 1, 1' and the base layer 2 such as "above" and "underneath" refer to the figurative representation of the roadway 12 in which the surface layer 1, 1' is pictured above the base layer 2.

Thus, the surface layer 1, 1' is in direct mechanical contact with traveling vehicles. However, the surface layer 1, 1' is exposed to wear and is also directly exposed to harmful environmental conditions such as water, snow, ice, heat, cold, thawing agents, etc. Therefore, the surface layer 1, 1' consists of a particularly wear-resistant material such as mastic asphalt, asphalt concrete, etc.

The surface layer 1, 1' consists of very finely grained material. The surface layer 1, 1' usually has a thickness of 30 to 40 mm. Road surface reconstruction programs call for replacing the surface layer 1, 1' at time intervals that depend on the anticipated wear. Time intervals for replacing the surface layer 1, 1' ranging from 5 to 20 years are typical. However, even before such a replacement of the surface layer 1, 1' takes places, it is common for the surface layer 1, 1' to exhibit regions of non-uniform thickness and to include wheel ruts in areas of the road surface 10 where many vehicles travel.

Figure 4:
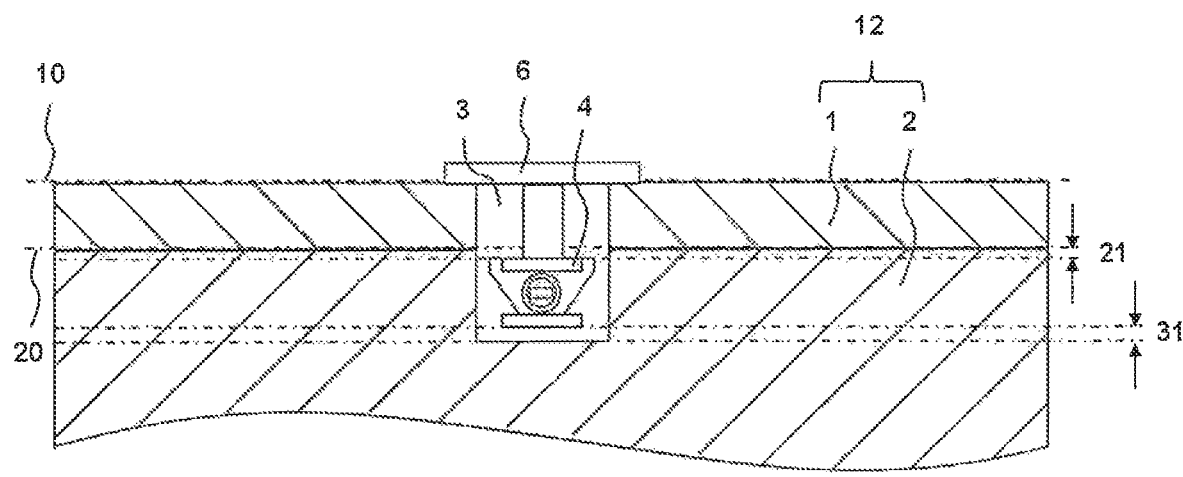
FIG. 4 shows a cross section of the roadway according to FIG. 3 with a WIM sensor according to FIG. 1 suspended in the groove.
Figure 5:
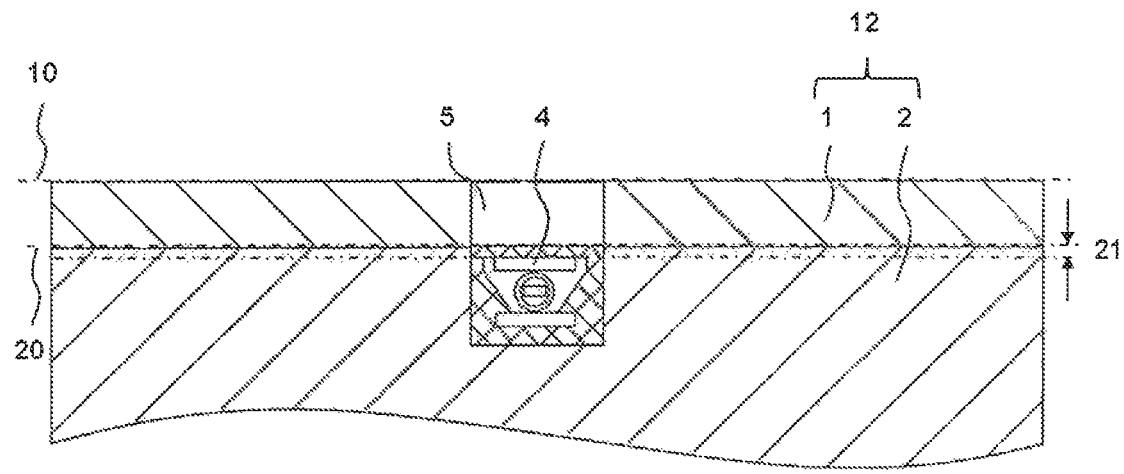
FIG. 5 shows a cross section of the roadway according to FIG. 4 with the WIM sensor of FIG. 1 cast with grout within the groove.

As schematically shown in FIGS. 4 and 5 for example, a base layer surface 20 of the base layer 2 is directly adjacent to the surface layer 1, 1'. The base layer 2 may be bonded or unbonded. A bonded base layer 2 is consolidated with the ground or consists of granular material such as gravel, sand, crushed rock, etc. mixed with a binder such as bitumen, cement, etc. In this way, the bonded base layer 2 is durable and frost resistant. The bonded base layer 2 is also called a binder layer. The unbonded base layer 2 consists of coarsely grained material such as gravel, sand, crushed rock, etc. An unbonded base layer 2 is particularly permeable for water to quickly dissipate water penetrating into the roadway 12. A lowermost unbonded base layer 2 is also referred to as an antifreeze layer.

A grain size of the materials of the surface layer 1, 1' and base layer 2 is often normalized. Thus, in Switzerland, the grain size of the materials of surface layer 1, 1' and base layer 2 is regulated by basic standard No. SN-640420-2015. Preferably, the very fine-grained material of the surface layer 1, 1' has a maximum particle size of 8 mm. Preferably, the granular material of the bonded base layer 2 has a maximum grain size of 22 mm. Preferably, the coarse-grained material of the unbonded base layer 2 has a maximum grain size in the range of 16 mm to 32 mm.

The person skilled in the art is able distinguish between surface layer 1, 1' and base layer 2 in a number of ways. Thus, those skilled in the art may consult a blueprint of the roadway 12. The blueprint often specifies a thickness of the surface layer 1, 1' with an accuracy of +/−5 mm. Thus, the person skilled in the art is able to precisely determine the thickness of the surface layer 1, 1' on the basis of the construction plan. Irrespective of this, however, the person skilled in the art may also perform a core hole bore of the roadway 12 because the equivalent diameter of the very finely grained material of the surface layer 1, 1' is different from that of the granular material or the coarse-grained material of the base layer 2. The core hole bore provides a cylindrical drill core showing a profile of the roadway 12 in the direction of its thickness. This thickness profile extends from the road surface 10 of the surface layer 1, 1' far into the base layer 2. A transition from the surface layer 1, 1' to the base layer surface 20 of the base layer 2 is visually detectable with an accuracy of +/−5 mm. Therefore, those skilled in the art are also able to precisely determine the thickness of the surface layer 1, 1' on the basis of the drill core.

A roadway 12 with intense traffic comprises a plurality of base layers 2 above a subgrade. Thus, a plurality of bonded base layers 2 are disposed above a plurality of unbonded base layers 2, for example. Generally, a grain size of the material used in the base layers 2 and a thickness of the base layers 2 increase from top to bottom. For the purposes of the invention, terms describing properties of the base layer 2 such as "above", "upper", "below" and "lower" refer to the figurative representation in which an uppermost base layer 2 is delimited by the base layer surface 20. Furthermore, only one uppermost base layer 2 is figuratively shown. Usually, an individual base layer 2 has a thickness of 80 mm (binder layer) to 300 mm (antifreeze layer). In this case, a carriageway comprising two bonded base layers 2 and two unbonded base layers 2 will have a thickness of up to 750 mm. In contrast to the surface layer 1, 1', the base layer 2 is not replaced at regular intervals. The base layer 2 is constructed to outlive a service life of around 50 years.

A WIM sensor is known in the art. Thus, EP0491655A1, EP0654654A1 and also U.S. Pat. No. 5,461,924, which is hereby incorporated herein by this reference for all purposes, disclose a WIM sensor in the embodiment of a piezoelectric force transducer. Such a WIM sensor is also sold commercially by the applicant and is described in data sheet No. 9195G_003-75e-04.16. The WIM sensor is available in lengths of 1.5 m, 1.75 m and 2.0 m. The WIM sensor has a width of 56 mm and a height of 34 mm.

FIG. 1 schematically shows the WIM sensor 4 comprising a hollow profile made of metal with an upper force introduction flange 41 and a lower force anchoring flange 42 and a tubular element 43 disposed therebetween. Force introduction flange 41, force anchoring flange 42 and tubular element 43 are preferably formed integrally with each other. For the purposes of the present invention, terms describing properties of the WIM sensor 4 such as "upper" and "lower" refer to the figurative representation in which the force introduction flange 41 is pictured above the force anchoring flange 42. A weight force to be detected acts onto a top surface 410 of the force introduction flange 41. The force introduction flange 41 transmits the weight force onto the tubular element 43. The force anchoring flange 42 is configured for anchoring the WIM sensor 4 with the grout 5 and is configured for being embedded in the grout 5.

As schematically shown in FIG. 1, the WIM sensor 4 includes a plurality of disc-shaped piezoelectric transducer elements 44, which are arranged in the tubular element 43, which is sealed in a water-tight and gas-tight manner so that the piezoelectric transducer elements 44 are protected from harmful environmental conditions. The piezoelectric transducer elements 44 are disc-shaped and made of piezoelectric crystal material such as quartz (SiO2 single crystal), calcium gallo germanate (Ca3Ga2Ge4O14 or CGG), langasite (La3Ga5SiO14 or LGS), tourmaline, gallium orthophosphate, plezoceramics, etc. The piezoelectric elements 44 are cut in a crystallographic orientation that ensures a high sensitivity for the weight force to be detected. Preferably, the orientation of the piezoelectric elements 44 is such that negative and positive electric polarization charges are generated on those surfaces onto which the weight force acts against the vertical direction. For a weight force detected, the piezoelectric transducer elements 44 emit an electrical signal that is proportional to the magnitude of the weight force detected, and such electrical signal is transmitted to an evaluation unit that is disposed outside the tubular element 43. The evaluation unit is not depicted in the figures. The electrical signal that has been transmitted from the piezoelectric transducer elements 44 is then evaluated in the evaluation unit. The WIM sensor 4 and the evaluation unit form a system for automatically collecting traffic information.

FIG. 1 shows a schematic cross section through a portion of an embodiment of a WIM sensor with the width shown in the left to right (or horizontal direction), the height in the top to bottom (or vertical direction), and the length in the direction perpendicular to plane in which the drawing sheet lies (into and out of the sheet). A respective insulating member 45, 45' is arranged along the length of the hollow profile and at opposite sides of the width of the hollow profile. Accordingly, in the view of FIG. 1, one insulating member 45 is disposed to the left of the hollow profile and the other insulating member 45' is disposed to the right of the hollow profile. Each of the two insulating members 45, 45' is attached to one of the respective outer surfaces of the hollow profile. For the purposes of the present description, terms describing properties of the WIM sensor 4 such as "left" and "right" refer to the figurative representation in which the two insulating members 45, 45' are pictured on the left and on the right of the hollow profile. Upper ends of the insulating members 45, 45' extend to a left lateral surface 411 and to a right lateral surface 411' of the force introduction flange 41. The two insulating members 45, 45' are made of a material with low compression modulus and low elastic modulus such as silicone foam, rubber, expanded polypropylene (EPP), ethylene-propylene-diene rubber (EPDM), etc. The two insulating members 45, 45' prevent the introduction of rolling forces into the hollow profile. In fact, the weight force of a vehicle leads to bending of the roadway 12, also referred to as deflection. When vehicles travel on the roadway 12, the deflection is manifested in the form of rolling forces, which rolling forces act ahead of or behind the traveling vehicles in the direction of travel. The rolling forces are directed toward the WIM sensor 4 from the surface layer 1, 1' and the base layer 2 as well as from the grout 5. When rolling forces reach the piezoelectric transducer elements 44, then the rolling forces falsify the detection of the weight force. For an accurate detection of the weight force, it is therefore necessary to effectively prevent the rolling forces from impacting the hollow profile, and the insulating members 45, 45' are intended to perform this preventative function by absorbing the rolling force before the rolling force can impact the profile.

While the WIM sensor according to data sheet No. 9195G_003-75e-04.16 comprises a cover, the WIM sensor 4 according to the present invention is designed without any cover. Thus, the upper surface 410 of the WIM sensor 4 according to the present invention lacks any cover and is an exposed surface. The WIM sensor according to data sheet No. 9195G_003-75e-04.16 is supplied with a cover that is mounted in the road surface 10 with the cover being flush with the surface. This cover is arranged above the force introduction flange and is made of hardened grout, a composite material, etc. The thickness of this cover is 10 mm so that the total thickness of the WIM sensor according to data sheet No. 9195G_003-75e-04.16 is 44 mm. However, since the WIM sensor 4 according to the present invention is installed underneath the surface layer 1, 1', the WIM sensor 4 according to the present invention does not requires any cover. Therefore, the WIM sensor 4 according to the present invention may be produced at lower cost because the manufacturing step of applying a cover is eliminated. Furthermore, the WIM sensor 4 according to the present invention is also cheaper in delivery to the mounting site because it is much lighter in weight than the conventional WIM sensor that includes a cover. Finally, mounting of the WIM sensor 4 according to the present invention in the roadway 12 is easier because the WIM sensor 4 of the present invention is much lighter in weight than the conventional WIM sensor that includes a cover whereby lifting and positioning of the WIM sensor 4 of the present invention is facilitated.

Preferably, the WIM sensor 4 of the present invention is installed in the roadway 12 obliquely or perpendicularly to the direction of travel of the vehicles traveling on the roadway 12. Such direction of travel in FIG. 1 would be left to right or right to left. For this purpose of preparing for installing the WIM sensor 4 of the present invention, a groove 3 is made in the roadway 12. Thereafter, the WIM sensor 4 is inserted in the groove 3, and then the groove 3 is cast with grout 5.

FIGS. 2 to 7 show a first embodiment of the method according to the invention of installing the WIM sensor 4 in an already finished roadway 12 having a surface layer 1. In this embodiment, the construction of the roadway 12 is completed before the WIM sensor 4 is installed, and thus is a sort of retrofit embodiment of the method.

Figure 2:
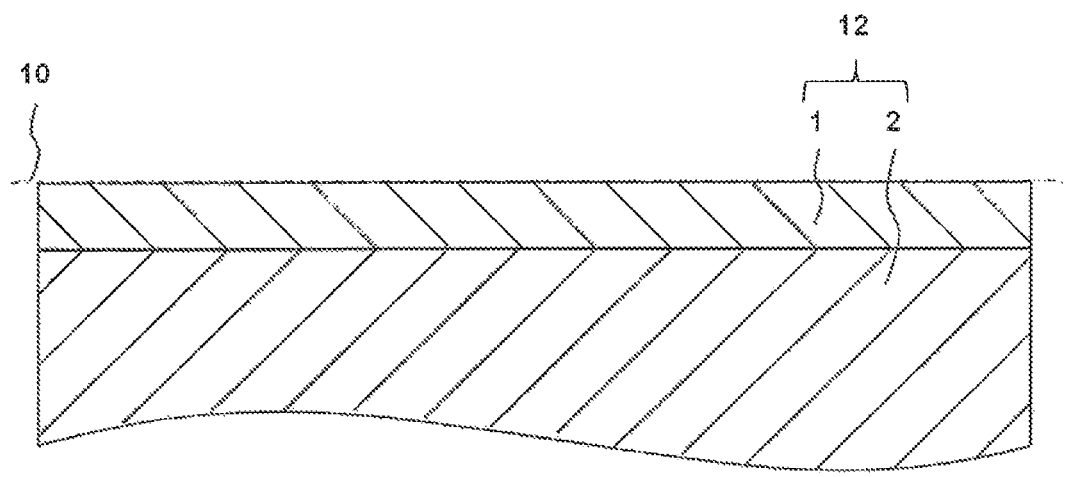
FIG. 2 shows a cross section through a portion of a first embodiment of a roadway comprising a surface layer and base layer.

FIG. 2 shows the roadway 12 with the surface layer 1 and base layer 2. The surface layer 1 has a thickness of 40 mm, for example. As schematically shown in FIG. 4, the thickness of the surface layer 1 is measured from the road surface 10 to the base layer surface 20.

Figure 3:
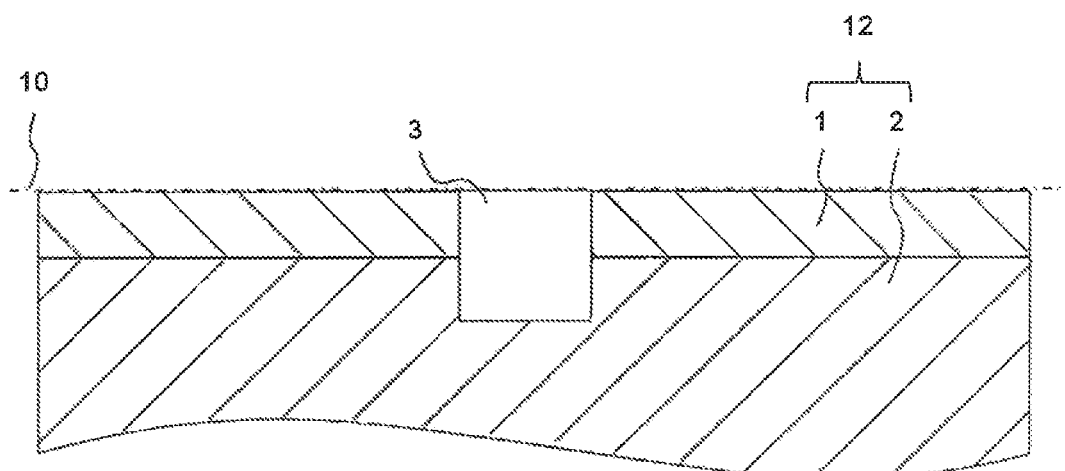
FIG. 3 shows a cross section of the roadway according to FIG. 2 with a groove prepared in the surface layer and the base layer.

According to FIG. 3, a groove 3 is prepared in the roadway 12. The groove 3 is made using a suitable tool such as a milling machine, etc. The groove extends obliquely or perpendicularly to the direction of travel of the vehicles 12 traveling on the roadway. The groove 3 has a length, which length is greater than the length of the WIM sensor 4. For example, for a WIM sensor having a length of 2.0 m the length of the groove will be 2.2 m. The groove 3 has a width, which width is greater than the width of the WIM sensor 4. For example, for a WIM sensor 4 having a width of 56 mm the width of the groove will be 75 mm. The groove 3 is configured with a depth that extends the groove 3 down through the surface layer 1 and into the base layer 2. The depth of the groove 3 has a magnitude that is greater than the magnitude of the depth of the WIM sensor 4. For example, for a WIM sensor 4 having a depth of 34 mm the depth of the groove will be 80 mm.

According to FIG. 4, the WIM sensor 4 is inserted into the groove 3. Preferably, the WIM sensor 4 is introduced centrally into the groove 3 using an introduction device 6. Preferably, the WIM sensor 4 is introduced into the groove 3 in a very precise manner by suspending the WIM sensor 4 using the insertion device 6 so that the force anchoring flange of the WIM sensor 4 is suspended above the bottom of the groove 3 at an anchoring distance 31 of several millimeters. For example, the anchoring distance 31 between a lower surface of the force anchoring flange 42 and an upper surface of the bottom of the groove 3 is exactly 10 mm with an inaccuracy in suspending the WIM sensor 4 of less than 1 mm.

Groove 3 is prepared in the base layer 2 to such a depth that the WIM sensor 4 suspended in the groove 3 does not project beyond the base layer surface 20. Preferably, the WIM sensor 4 is introduced into the groove 3 in a very precise manner by suspending the WIM sensor 4 using the introduction device 6 so that the WIM sensor 4 is suspended at a safety distance 21 below the base layer surface 20. For a base layer surface 20 situated 40 mm below the road surface 10 and a groove 3 with a depth of 80 mm as well as a WIM sensor 4 with a depth of 34 m, the safety distance 21 between the upper surface of the force introduction flange and the base layer surface 20 is exactly 6 mm with an inaccuracy in suspending the WIM sensor 4 of less than 1 mm.

Introduction device 6 is made in one piece or in multiple pieces. Preferably, insertion device 6 is a beam made of metal, wood, etc. having a width, which width is greater than that of the groove 3. For example, for a groove 3 having a width of 75 mm the introduction device 6 will have a width of 100 mm. The WIM sensor 4 is reversibly attached to a lower surface of the introduction device 6 by suitable means so that when the introduction device 6 with the WIM sensor 4 attached to the introduction device 6 is placed on the surface layer 1 in the area of the groove 3, then the WIM sensor 4 attached to the insertion device 6 hangs down into the groove 3 as schematically shown in FIG. 4. The WIM sensor 4 is attached to the underside of the insertion device 6 in a force-fitting and/or form-fitting manner, for example. A force-fitting attachment of the WIM sensor 4 to the suspension device 6 may be achieved by means of vacuum, etc. A force-fitting and form-fitting attachment of the WIM sensor 4 to the suspension device 6 may be achieved by means of a screw, etc. A form-fitting attachment of the WIM sensor 4 to the suspension device 6 may be achieved by means of cable ties, ropes, etc. In each case, the manner of attachment is reversible so as to allow controlled release of the WIM sensor 4 from the suspension device 6.

As shown in FIG. 5, the groove 3 with the WIM sensor 4 suspended therein is cast with grout 5. Grout 5 is a liquid plastic that is rapidly cured in ambient air such as an epoxy resin, etc. Grout 5 cures in ambient air within a few hours depending on the ambient temperature. Grout 5 is commercially available from the applicant and is described in applicant's data sheet No. 1000A1_003-156e-01.18. Groove 3 is cast with as much grout 5 as is necessary to make the grout 5 flush with the road surface 10. Preferably, the introduction device 6 comprises openings for pouring the grout 5 into the groove 3. The openings are not represented figuratively in FIG. 4. Groove 3 is cast with so much grout 5 that the poured grout 5 reaches the introduction device 6. During casting the groove 3 with grout 5, the lower surface of the introduction device 6 serves as a measuring gage because as soon as the groove 3 is completely filled with grout 5, then the grout 5 abuts at the bottom surface of the introduction device 6 so that it is flush with the road surface 10. For the purposes of the present invention, "flush" means that a surface of the grout 5 cast into the groove 3 deviates by less than 1 mm from the road surface 10 within the machining tolerance. FIG. 5 shows the WIM sensor 4 that is cast completely with grout 5 after the suspension device 6 was removed.

Having now been exposed to the method of the present invention, the person of ordinary should appreciate that the WIM sensor 4 may also be suspended in a groove 3 that is already partially filled with grout 5. For example, the groove 3 is filled with grout 5 up to a height of 25 mm below the road surface 10 prior to suspending the WIM sensor 4 in the groove 3. This has the advantage that the grout 5 does not have to be poured into the groove 3 through openings of the introduction device 6. Instead, because the grout 5 is poured into the groove 3 before the introduction device 6 is placed on the surface layer 1 in the area of the groove 3, the pouring of the grout is much faster and easier to perform. Then, the WIM sensor 4 attached to the insertion device 6 is introduced into the groove 3, the WIM sensor 4 is immerged in the grout 5, and the groove 3 is already almost completely filled with grout 5. For the purposes of the present invention, the adjective "almost" denotes a variation of +/−10%.

Figure 6:
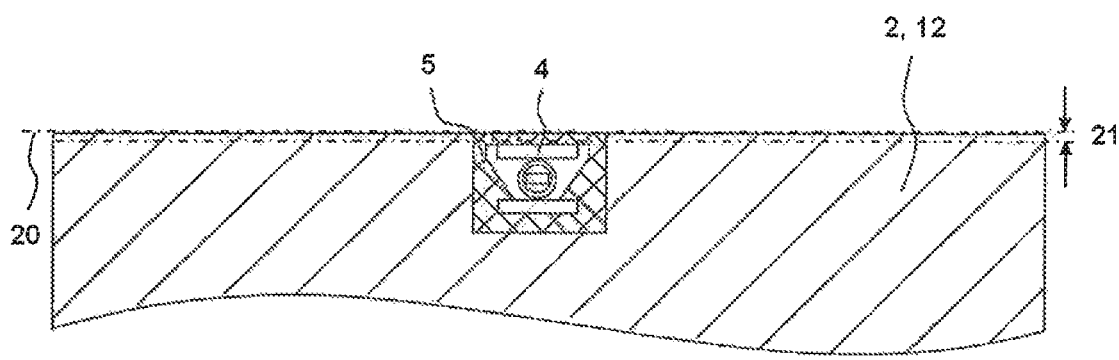
FIG. 6 shows a cross section of the roadway according to FIG. 5 after the surface layer was removed.

As noted above, after a surface layer 1 becomes worn, then the worn surface layer 1 is replaced in the course a roadway resurfacing program. For this purpose, the worn surface layer 1 is removed and replaced by a new surface layer 1'. FIG. 6 shows the roadway 12 according to FIG. 5 after the original surface layer 1 that originally covered the WIM sensor 4 has been removed. The surface layer 1 is removed by a suitable tool such as a milling machine, etc. For example, the worn surface layer 1 with a thickness of 40 mm is completely removed down to the base layer surface 20. Since the WIM sensor 4 does not protrude beyond the base layer surface 20, the WIM sensor 4 is not damaged when the worn surface layer 1 is removed. The WIM sensor 4 desirably is inserted at a safety distance 21 of exactly 6 mm below the base layer surface 20, for example, so that even when a removal tolerance of 5 mm for the removal of the worn surface layer 1 is taken into account, it is impossible to damage the WIM sensor 4 during the removal of the worn surface layer 1.

Figure 7:
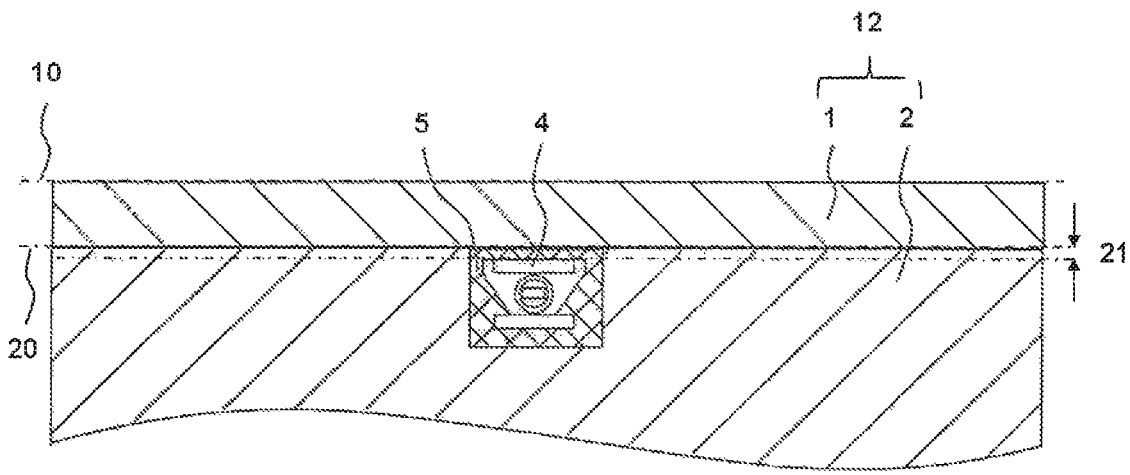
FIG. 7 shows a cross section of the roadway according to FIG. 6 after a new surface layer was applied.

FIG. 7 shows the roadway 12 according to FIG. 6 with a newly applied surface layer 1'. The newly applied surface layer 1' again has a thickness of 40 mm, for example.

FIGS. 8 to 14 show a second embodiment of the method according to the invention of mounting a WIM sensor 4 in a roadway 12 without a surface layer 1. In this embodiment of the method according to the invention, the roadway 12 is not yet finished, and the WIM sensor 4 is installed in a roadway 12 that is not yet finished.

Figure 8:
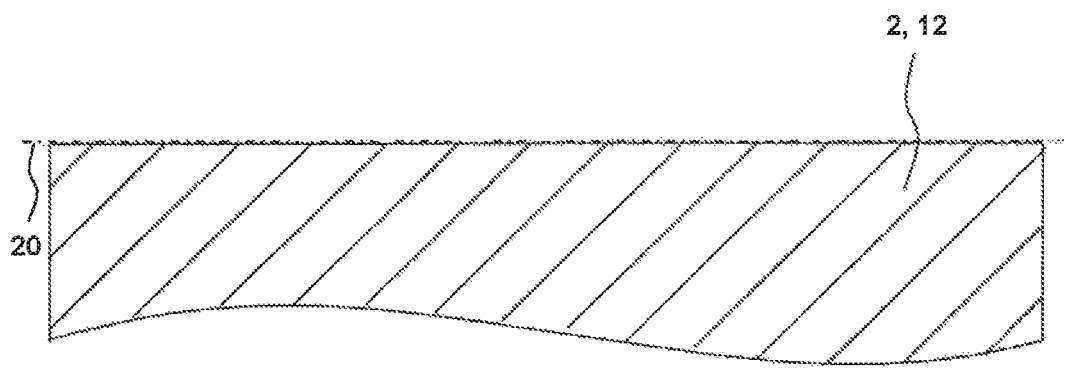
FIG. 8 shows a cross section through a portion of a second embodiment of a roadway without surface layer and base layer.

FIG. 8 shows the roadway 12 that comprises only a base layer 2 and without any surface layer 1.

Figure 9:
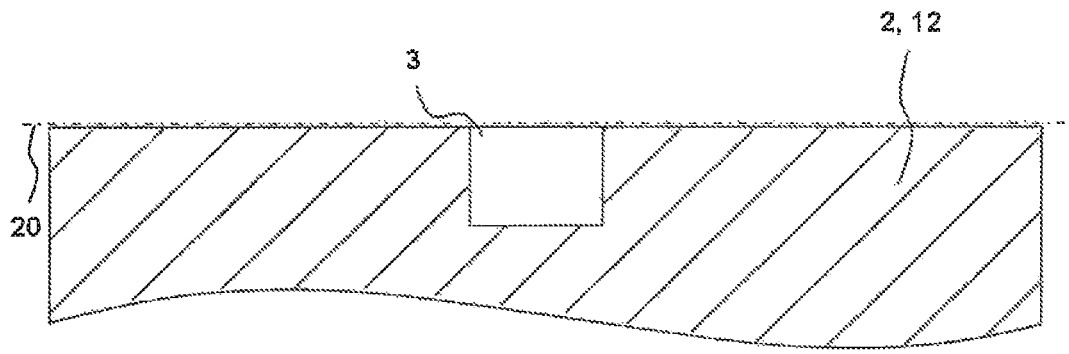
FIG. 9 shows a cross section of the roadway according to FIG. 8 with a groove made in the base layer.

According to FIG. 9, a groove 3 is prepared in the base layer 2 of the roadway 12. The groove 3 is made using a suitable tool such as a milling machine, etc. Preferably, the groove 3 extends obliquely or perpendicularly to the direction of travel of the vehicles traveling on the roadway 12. Groove 3 has a length, which length is greater than the length of the WIM sensor 4. For example, for a WIM sensor having a length of 2.0 m the groove will be 2.2 m long. The groove 3 has a width, which width is greater than the width of the WIM sensor 4. For example, for a WIM Sensor 4 having a width of 56 mm the groove will have a width of 75 mm. The depth of the groove 3 extends down into the depth of the base layer 2. The magnitude of the depth of the groove 3 in the base layer 2 is greater than the magnitude of the depth of the WIM sensor 4. For example, for a WIM sensor 4 having a depth of 34 mm, the groove will be 40 mm deep beneath the base layer surface 20.

Figure 10:
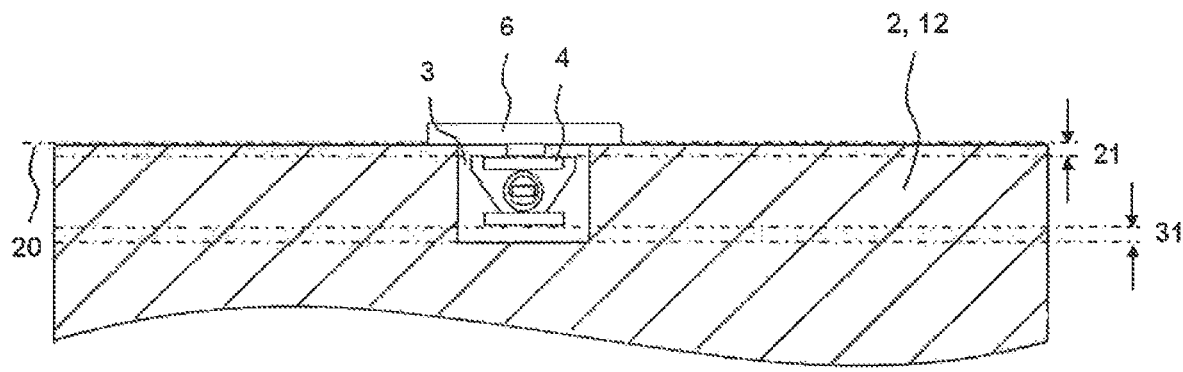
FIG. 10 shows a cross section of the roadway according to FIG. 9 with a WIM sensor according to FIG. 1 suspended in the groove.

As schematically shown in FIG. 10, the WIM sensor 4 is introduced into the groove 3. Preferably, the WIM sensor 4 is introduced into the groove 3 centrally by using the introduction device 6. Preferably, the WIM sensor 4 is introduced in the groove 3 in a precise manner by suspending the WIM sensor 4 using the insertion device 6 so that the force anchoring flange of the WIM sensor 4 is suspended above the bottom of the groove 3 at the anchoring distance 31 of several millimeters. For example, the anchoring distance 31 between a lower surface of the force anchoring flange 42 and an upper surface of the bottom of the groove 3 is exactly 10 mm with an inaccuracy in suspending the WIM sensor 4 of less than 1 mm.

As schematically shown in FIG. 10, the groove 3 is made in the base layer 2 to such a depth that the WIM sensor 4 suspended in the groove 3 does not project beyond the base layer surface 20. Preferably, the WIM sensor 4 is introduced in the groove 3 in a precise manner by suspending the WIM sensor 4 using the introduction device 6 so that the WIM sensor 4 is suspended at a safety distance 21 below the base layer surface 20. For a groove 3 with a depth of 40 mm and a WIM sensor 4 with a depth of 34 mm, the safety distance 21 between the upper surface of the force introduction flange and the base layer surface 20 is exactly 6 mm with an inaccuracy in suspending the WIM sensor 4 of less than 1 mm.

Introduction device 6 is made in one piece or in multiple pieces. Preferably, insertion device 6 is a beam made of metal, wood, etc. with a width, which width is greater than that of the groove 3. For example, for a groove 3 having a width of 75 mm the introduction device 6 will have a width of 100 mm. The WIM sensor 4 is reversibly attached to a lower surface of the introduction device 6 by suitable means so that when the introduction device 6 with the WIM sensor 4 attached to the introduction device 6 is placed on the base layer 2 in the area the groove 3, then the WIM sensor 4 attached to the insertion device 6 hangs down into the groove 3. The WIM sensor 4 is attached to the lower surface of the insertion device 6 in a force-fitting and/or form-fitting manner, for example. A force-fitting attachment of the WIM sensor 4 to the suspension device 6 may be achieved by means of vacuum, etc. A force-fitting and form-fitting attachment of the WIM sensor 4 to the suspension device 6 may be achieved by means of a screw connection, etc. A form-fitting attachment of the WIM sensor 4 to the suspension device 6 may be achieved by means of cable ties, ropes, etc.

Figure 11:
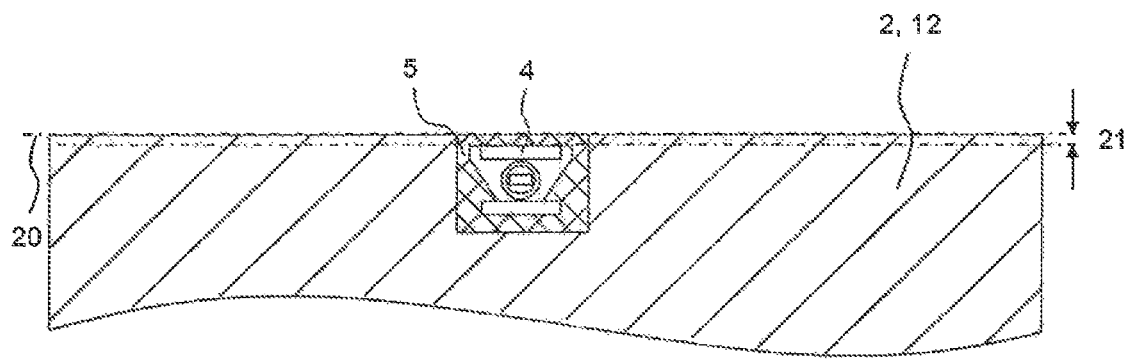
FIG. 11 shows a cross section of the roadway according to FIG. 10 with the WIM sensor of FIG. 1 cast with grout within the groove.

FIG. 11 schematically shows the WIM sensor 4 after the groove 3 has been cast completely with grout 5 and the suspension device 6 has been removed. As shown in FIG. 11, the groove 3 with the WIM sensor 4 suspended therein is cast with grout 5, which is a liquid plastic that is rapidly cured in ambient air such as an epoxy resin, etc. Grout 5 cures in ambient air within a few hours depending on the ambient temperature. Grout 5 is commercially available from the applicant and is described in data sheet No. 1000A1_003-156e-01.18. Groove 3 is cast with as much grout 5 as is necessary to cover the WIM sensor 4 and make the grout 5 flush with the base layer surface 20. Preferably, the introduction device 6 comprises openings for pouring the grout 5 into the groove 3. The openings are not represented figuratively in FIG. 11. Groove 3 is cast with so much grout 5 that the poured grout 5 reaches the introduction device 6. During casting the groove 3 with grout 5, the lower surface of the introduction device 6 serves as a measuring gage for determining when enough grout 5 has been introduced. As soon as the groove 3 is completely filled with grout 5, then the grout 5 abuts at the bottom surface of the introduction device 6 and becomes flush with the base layer surface 20. For the purposes of the present invention, "flush" means that a surface of the grout 5 cast into the groove 3 deviates by less than 1 mm from the base layer surface 20 within the machining tolerance.

Having now been exposed to the method of the present invention, the person of ordinary should appreciate that the WIM sensor 4 also may be suspended in a groove 3 that is already partially filled with grout 5. For example, the groove 3 is filled with grout 5 up to a height of 25 mm below the base layer surface 20 prior to suspending the WIM sensor 4 in the groove 3. This has the advantage that the grout 5 does not need to be poured into the groove 3 through openings of the introduction device 6. Instead, the grout 5 can be cast into the groove 3 before the introduction device 6 is placed on the base layer 2 in the area of the groove 3, and this is much faster and easier. Then, the WIM sensor 4 attached to the insertion device 6 is introduced into the groove 3, the WIM sensor 4 is immersed in the grout 5, and the groove 3 is already almost completely filled with grout 5. For the purposes of the present invention, the adjective "almost" denotes a variation of +/−10%.

Figure 12:
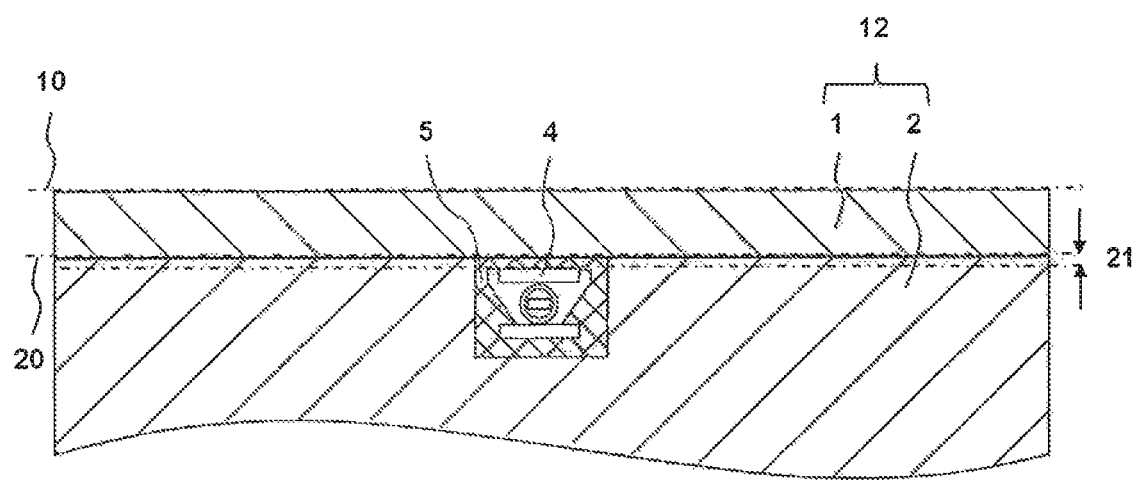
FIG. 12 shows a cross section of the roadway according to FIG. 11 after a surface layer was applied.

FIG. 12 schematically shows the roadway 12 after the surface layer 1 was applied on the base layer 2 according to FIG. 11. According to FIG. 12, the roadway 12 is finished, and the applied surface layer 1 has a thickness of 40 mm, for example.

Figure 13:
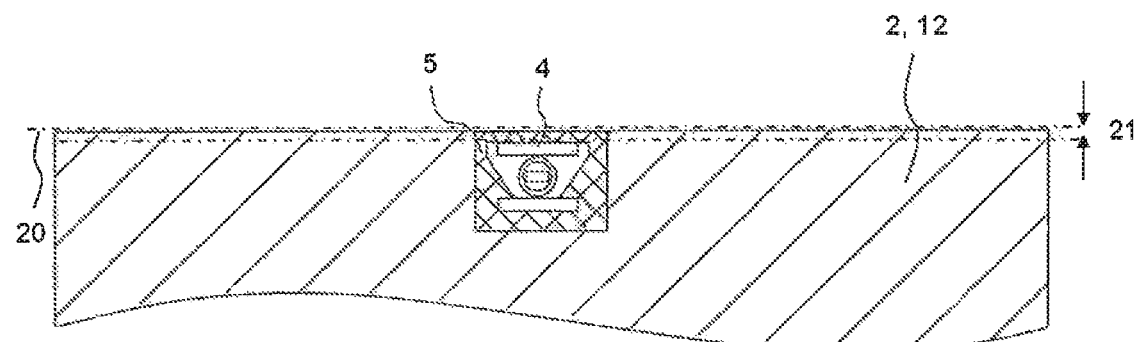
FIG. 13 shows a cross section of the roadway according to FIG. 12 after the surface layer was removed.

When a surface layer 1 is worn, then the worn surface layer 1 is replaced in the course a roadway resurfacing program. For this purpose, the worn surface layer 1 is removed and replaced by a new surface layer 1'. FIG. 13 shows the roadway 12 according to FIG. 12 after the worn surface layer 1 was removed. The worn surface layer 1 is removed by a suitable tool such as a milling machine, etc. For example, the worn surface layer 1 with a thickness of 40 mm is completely removed down to the base layer surface 20. Since the WIM sensor 4 does not protrude beyond the base layer surface 20, the WIM sensor 4 is not damaged when the worn surface layer 1 is removed. The WIM sensor 4 is inserted below the base layer surface 20 at a safety distance 21 of exactly 6 mm, for example, so that even when a removal tolerance of 5 mm for the removal of the worn surface layer 1 is taken into account, it is impossible to damage the WIM sensor 4 during removal of the worn surface layer 1.

Figure 14:
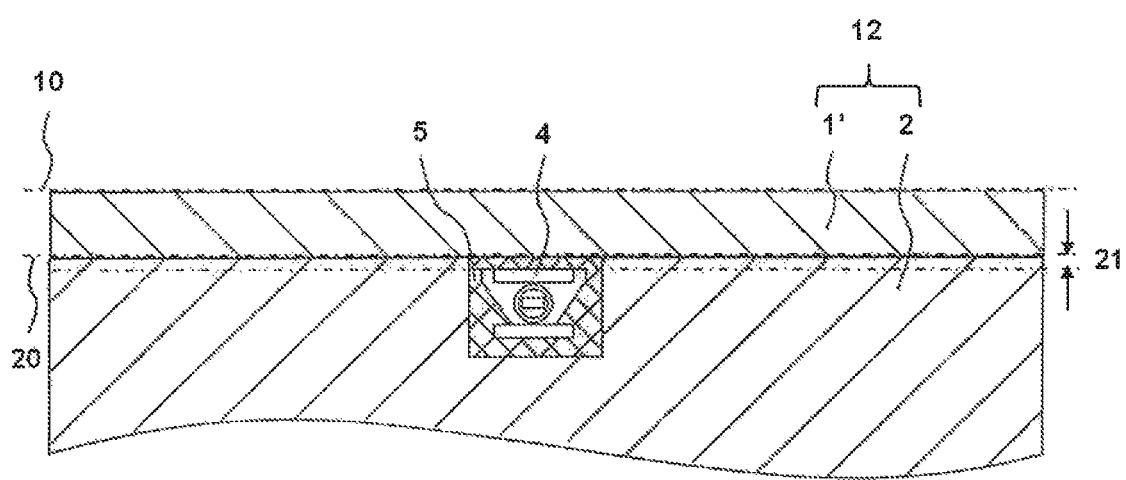
FIG. 14 shows a cross section of the roadway according to FIG. 13 after a new surface layer was applied.

FIG. 14 shows the roadway 12 according to FIG. 13 with a newly applied surface layer 1'. The newly applied surface layer 1' again has a thickness of 40 mm, for example.

LIST OF REFERENCE NUMERALS 1, originally applied surface layer
1' newly applied surface layer
2 base layer
3 groove
4 WIM sensor
5 grout
6 introduction device
10 road surface
12 roadway
20 base layer surface
21 safety distance
31 anchoring distance
41 force introduction flange
42 force anchoring flange
43 tubular element
44 piezoelectric transducer elements
45, 45' insulating members
410 upper surface
411,411' lateral surfaces

What is claimed is:

1. A method of mounting a Weigh-In-Motion (WIM) sensor in a roadway, which mounted WIM sensor detects a weight force of a vehicle traveling on the roadway, and which roadway has a surface layer formed of a first material with grains of a first size and a base layer with grains of a second size that is larger than the first size and disposed directly adjacent and beneath the surface layer, the method comprising the following steps:
   making a groove through the surface layer of the roadway, wherein groove extends into the base layer of the roadway;
   inserting the WIM sensor into the groove;
   pouring grout into the groove covering the WIM sensor; and
   covering the grout with added portions of the first material with grains of the first size that is smaller than the grains of the base layer.

2. The method according to claim 1, wherein the groove is extended into the base layer to such a depth that the WIM sensor introduced into the groove does not protrude to reach the surface layer.

3. The method according to claim 1, wherein the groove is cast with so much grout that the grout is flush with the road surface of the surface layer.

4. The method according to claim 1, further comprising the steps of removing a worn surface layer and applying a new surface layer to replace the removed worn surface layer.

5. The method according to claim 1, wherein the step of inserting the WIM sensor into the groove is effected using an introduction device that disposes the WIM sensor centrally of the groove.

6. The method according to claim 5, wherein the groove is cast with so much grout that the cast grout abuts at the introduction device.

7. The method according to claim 5, wherein the WIM sensor is suspended by means of the introduction device at an anchoring distance above a bottom of the groove.

8. A method of mounting a Weigh-In-Motion (WIM) sensor in a roadway, which mounted WIM sensor detects a weight force of a vehicle traveling on the roadway, and which roadway has a surface layer formed of a first material and a base layer disposed directly adjacent and beneath the surface layer, the method comprising the following steps:
   making a groove through the surface layer of the roadway, wherein groove extends into the base layer of roadway;
   inserting the WIM sensor into the groove;
   pouring grout into the groove; and
   covering the grout with added portions of the first material;
   wherein the base layer defines a base layer surface that is disposed directly beneath and in contact with the surface layer, and wherein the WIM sensor is suspended by means of an introduction device at a safety distance below the base layer surface of the base layer.

9. The method according to claim 8, wherein the WIM sensor is suspended by means of the introduction device at an anchoring distance above a bottom of the groove.

10. A method of mounting a Weigh-in-Motion (WIM) sensor in a roadway, which mounted WIM sensor detects a weight force of a vehicle traveling on the roadway, and which roadway has a base layer disposed to underlie and support a surface layer formed of a first material that will become disposed directly adjacent and above the base layer formed of a second material, the method comprising the following steps:
- making a groove through the base layer of the roadway;
- inserting the WIM sensor into the groove;
- pouring grout into the groove to cover the WIM sensor; and
- covering the grout with the first material to form the roadway.

11. The method according to claim 10, wherein the base layer defines a base layer surface that is disposed to be directly beneath and in contact with the surface layer, and wherein the groove is cast with so much grout that the grout is flush with the base layer surface of the base layer.

12. The method according to claim 10, wherein the WIM sensor is introduced centrally into the groove by means of an introduction device; and the groove is cast with so much grout that the cast grout abuts at the introduction device.

13. The method according to claim 10, further comprising the steps of removing a worn surface layer and applying a new surface layer to replace the removed worn surface layer.

14. A Weigh-In-Motion (WIM) sensor for being embedded in a groove beneath the exposed upper surface of a roadway, the WIM sensor comprising:
- a force introduction flange having an upper surface that is exposed to the atmosphere, said force introduction flange having a lateral surface connected by an edge to the upper surface wherein the lateral surface is disposed at an angle with respect to the upper surface; and
- a plurality of insulating members, wherein each of the plurality of insulating members extends to the lateral surface of the force introduction flange.

* * * * *